United States Patent
Koehrsen et al.

(10) Patent No.: US 9,134,721 B2
(45) Date of Patent: Sep. 15, 2015

(54) WORKSITE SYSTEM HAVING AWARENESS ZONE MAPPING AND CONTROL

(75) Inventors: Craig L. Koehrsen, East Peoria, IL (US); Thomas F. Doherty, Holland Park (AU)

(73) Assignee: Caterpillar Inc., Peoria, IL (US)

(*) Notice: Subject to any disclaimer, the term of this patent is extended or adjusted under 35 U.S.C. 154(b) by 1012 days.

(21) Appl. No.: 13/044,847

(22) Filed: Mar. 10, 2011

(65) Prior Publication Data

US 2012/0232779 A1 Sep. 13, 2012

(51) Int. Cl.
*G08G 1/16* (2006.01)
*G05B 19/4061* (2006.01)
*G05D 1/02* (2006.01)

(52) U.S. Cl.
CPC .......... *G05B 19/4061* (2013.01); *G05D 1/0278* (2013.01); *G05D 1/0289* (2013.01); *G05B 2219/49141* (2013.01); *G05D 2201/0202* (2013.01)

(58) Field of Classification Search
USPC .......................................................... 701/301
See application file for complete search history.

(56) References Cited

U.S. PATENT DOCUMENTS

| 6,980,131 B1 | 12/2005 | Taylor |
| 7,755,472 B2 | 7/2010 | Grossman |
| 2008/0125965 A1 | 5/2008 | Carani et al. |
| 2008/0129491 A1 | 6/2008 | Ruperto |
| 2008/0143593 A1 | 6/2008 | Graziano et al. |
| 2009/0043462 A1 | 2/2009 | Stratton et al. |
| 2009/0132163 A1 | 5/2009 | Ashley, Jr. et al. |
| 2009/0326734 A1 | 12/2009 | Gudat |
| 2010/0042940 A1 | 2/2010 | Monday et al. |
| 2012/0130582 A1* | 5/2012 | Hukkeri ........................ 701/25 |

FOREIGN PATENT DOCUMENTS

| JP | 02114305 | 4/1990 |
| WO | WO2005064091 | 7/2005 |

OTHER PUBLICATIONS

OziExplorer Features—Moving Map, htto://www.oziexplorer3.com/eng/features/features_moreinfo6.html, printed on Dec. 1, 2010.

* cited by examiner

*Primary Examiner* — Kim T Nguyen
(74) *Attorney, Agent, or Firm* — Finnegan, Henderson, Farabow, Garrett & Dunner, LLP

(57) ABSTRACT

A worksite system is disclosed. The worksite system may have an input module configured to receive at least one of a boundary and a characteristic of an awareness zone at a worksite, and at least one locating device configured to determine a position of a mobile machine and another mobile entity at the worksite. The worksite system may also have a controller in communication with the input module and the at least one locating device. The controller may be configured to track movement of the mobile machine, and to make a determination of a presence of the other mobile entity. The controller may also be configured to initiate a collision avoidance strategy in response to at least one of the mobile machine nearing or entering the awareness zone when the other mobile entity is in the awareness zone.

20 Claims, 3 Drawing Sheets

WORKSITE SYSTEM HAVING AWARENESS ZONE MAPPING AND CONTROL

TECHNICAL FIELD

The present disclosure is directed to a worksite system and, more particularly, to a worksite system having awareness zone mapping and control.

BACKGROUND

Mobile machines such as haul trucks, excavators, motor graders, backhoes, water trucks, and other large equipment are utilized at a common worksite to accomplish a variety of tasks. At these worksites, because of the size of these machines, lack of visibility, slow response time, and difficulty of operation, operators should be keenly aware of their surroundings. Specifically, each operator should be aware of the location of stationary objects at the worksite, road conditions, facilities, and other mobile machines in the same vicinity. Based on the speed of a particular machine, and its size and response profile, the operator of the machine should respond differently to each encountered obstacle in order to avoid collision and damage to the machine, the objects at the worksite, and the other mobile machines. In some situations, there may be insufficient warning for the operator to adequately maneuver the machine away from damaging encounters.

One way to reduce the likelihood of damaging encounters is disclosed in a document entitled "OziExplorer Features—Moving Map" that was downloaded from the internet site http://www.oziexplorer3.com/eng/features/features_moreinfo6.html on Dec. 1, 2010 ("the Ozi publication"). Specifically, the Ozi publication discloses a system that plots a machine's GPS position directly onto an electronic map displayed on a screen within the machine. The system also plots on the screen any number of waypoints in the path of the machine, as well as user-defined alarm zones set around stationary objects at the waypoints. The alarm zones are polygons drawn on the electronic map. When an alarm zone is entered by the machine, a custom alarm sounds within the machine.

Although the system of the Ozi publication may help to reduce the likelihood of a machine colliding with a stationary object located within a defined alarm zone, it may be less than optimal. In particular, the system of the Ozi publication may do little to reduce the likelihood of a mobile machine colliding with another mobile entity that does not have a designated alarm zone.

The disclosed worksite system is directed to overcoming one or more of the problems set forth above and/or other problems of the prior art.

SUMMARY

One aspect of the present disclosure is directed to a worksite system. The worksite system may include an input module configured to receive at least one of a boundary and a characteristic of an awareness zone at a worksite, and at least one locating device configured to determine a position of a mobile machine and another mobile entity at the worksite. The worksite system may also include a controller in communication with the input module and the at least one locating device. The controller may be configured to track movement of the mobile machine, and to make a determination of the presence of the mobile entity. The controller may also be configured to initiate a collision avoidance strategy in response to at least one of the mobile machine nearing or entering the awareness zone when the other mobile entity is in the awareness zone.

Another aspect of the present disclosure is directed to a method of avoiding collisions at a common worksite. The method may include receiving at least one of a boundary and a characteristic of an awareness zone at the common worksite, and tracking movement of a mobile machine. The method may further include determining a presence of another mobile entity in the awareness zone, and initiating a collision avoidance strategy in response to at least one of the mobile machine nearing or entering the awareness zone when the other mobile entity is in the awareness zone.

DETAILED DESCRIPTION

Figure 1:
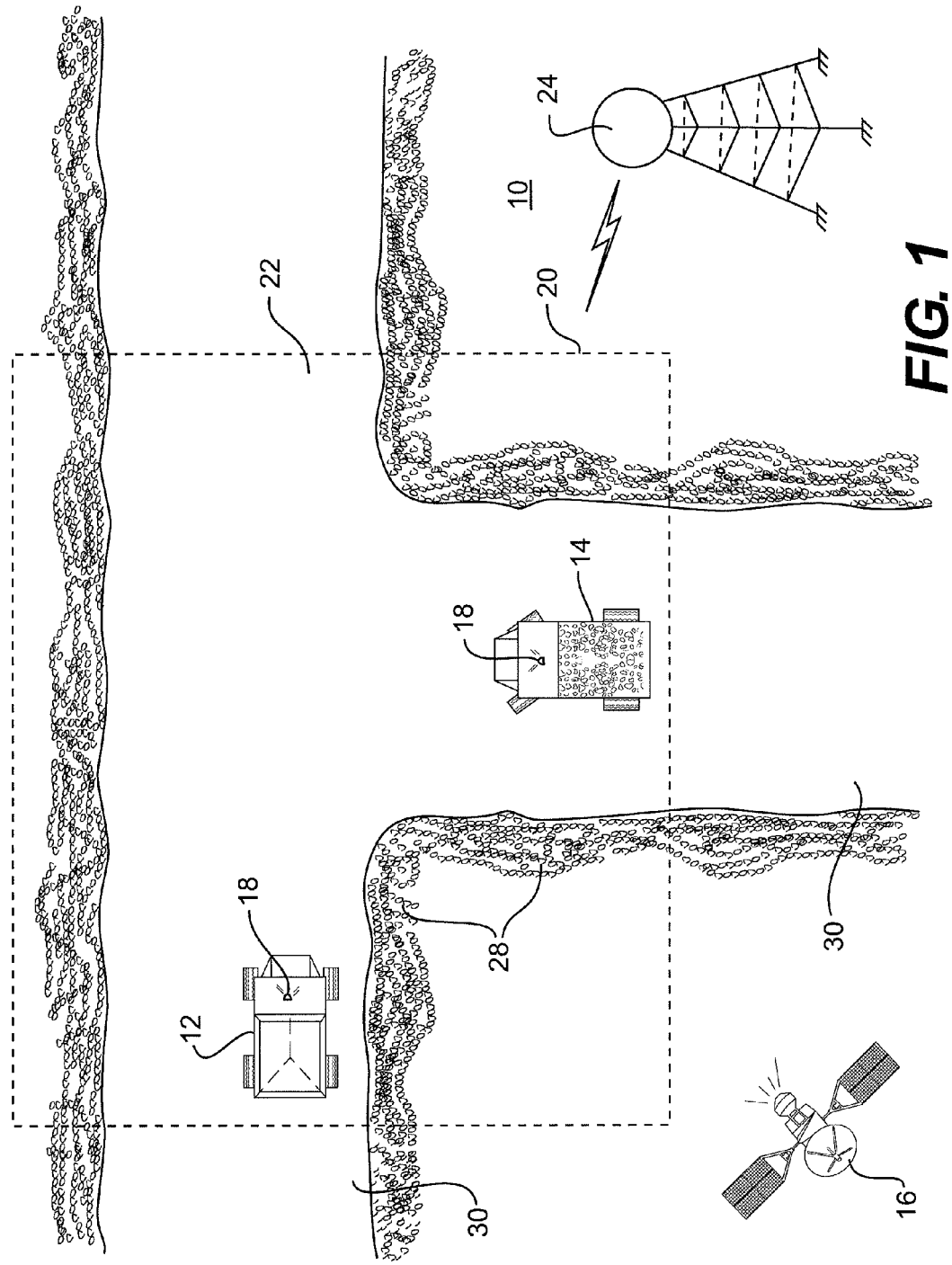
FIG. 1 is a diagrammatic illustration of exemplary disclosed machines operating at a common worksite.

FIG. 1 illustrates an exemplary worksite 10 with a first mobile machine 12 and a second mobile machine 14 performing predetermined tasks at worksite 10. Worksite 10 may include, for example, a mine site, a landfill, a quarry, a construction site, a road worksite, or any other type of worksite. The predetermined tasks may be associated with any work activity appropriate at worksite 10, and may require machines 12, 14 to generally traverse worksite 10. Any number of machines 12, 14 may operate at worksite 10, as desired. It is also contemplated that other mobile entities, for example pedestrians (not shown), may be co-located at worksite 10.

Machines 12, 14 may embody any type of mobile machines. For example, machines 12, 14 may each embody a haul truck, an excavator, a dozer, a wheel loader, a motor grader, a backhoe, a service vehicle, or a water truck. Machines 12, 14 may be manually controlled, remotely controlled, autonomously controlled, or be controlled using any combination of these technologies. As machines 12, 14 and the other mobile entities travel about worksite 10, a satellite network 16 or other tracking device or system may communicate with an onboard locating device 18 to monitor the movements of machines 12, 14 and the other mobile entities. During travel about worksite 10, machines 12, 14 may cross virtual boundaries 20, also known as a "geo-fences", that are associated with different awareness zones 22.

Figure 2:
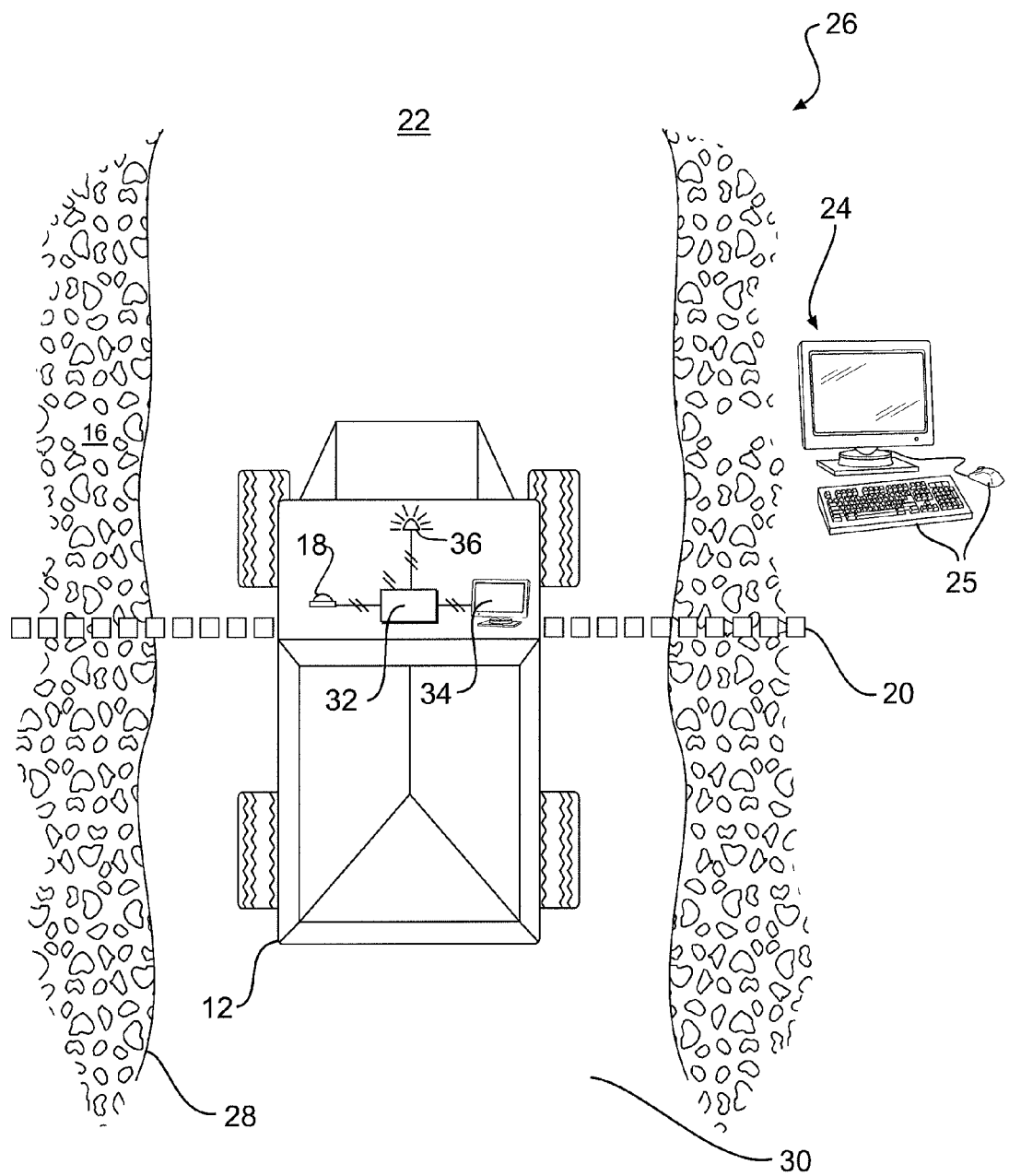
FIG. 2 is a schematic and diagrammatic illustration of an exemplary disclosed worksite system that may be used in conjunction with the machines of FIG. 1.

Locating devices 18 may be configured to determine a position of machines 12, 14 and the other mobile entities, and to generate signals indicative thereof. For example, locating devices 18 could form portions of a Global Positioning System (GPS), an Inertial Reference System (IRS), a local tracking system, or another known locating system that receives or determines positional information associated with machines 12, 14. Locating devices 18 may be in remote communication with a worksite controller 24 to convey signals indicative of the received or determined positional information for further processing. Worksite controller 24, as will be described in more detail below, may form a portion of a worksite system 26 (referring to FIG. 2) that selectively implements a collision avoidance strategy with machines 12, 14.

Awareness zones 22 may generally be stationary zones placed about particular features of worksite 10. The features may include, for example, an intersection, an excavation area, a dump area, a service area, or other areas at worksite 10, where site conditions may increase control difficulty associated with machines 12, 14. In the disclosed example, the depicted awareness zone 22 is associated with an intersection, at which berms 28 located along the sides of roadways 30 make it difficult to see traffic in the different branches of roadways 30. If unaccounted for, the operator of first mobile machine 12, when approaching the intersection, may have difficulty seeing over berms 28 and/or responding to the approach of second mobile machine 14 to the same intersection.

Awareness zones 22 may be represented by a virtual polygon on a display 34 within each machine 12, 14, and have at least one characteristic customizable by a user of worksite system 26. For example, the user may be allowed to customize at least one of a size, a shape, a position, and an orientation of awareness zone 22. It is also contemplated that all or a majority of worksite 10 may alternatively be divided into different zones, with the user then allowed to select only particular zones as awareness zones 22. A machine type, size, payload, age, or condition; a weather parameter such as a time of day, precipitation, visibility, traction, or road condition; a traffic density or accident occurrence rate; or another parameter of machines 12, 14 and/or worksite 10 may have an effect on the properties of awareness zone 22, if desired. For example, a size of awareness zone 22 may increase when larger and/or more heavily-loaded machines 12, 14 are approaching a particular feature at worksite 10 at a greater frequency during low-light conditions when fog is present.

Worksite system 26 may consist of components, including locating devices 18 and displays 34, that are located onboard each machine 12, 14 and/or associated with the other co-located mobile entities, which cooperate with worksite controller 24 to facilitate collision avoidance of mobile machines 12, 14 with each other and/or the other mobile entities at the designated features of worksite 10. In particular, worksite system 26 may include an onboard control module 32 associated with each machine 12, 14 that is in remote communication with worksite controller 24 and in direct communication with locating device 18 and display 34, and an alert device 36 that is in direct communication with control module 32. It is contemplated that locating device 18 may indirectly communicate with worksite controller 24 via control module 32 or another mobile machine or, alternatively, that locating device 18 may be in direct communication with worksite controller 24, as desired. It is further contemplated that display 34 and/or alert device 36 may additionally or alternatively be in direct communication with worksite controller 24.

Worksite controller 24 may embody a single microprocessor or multiple microprocessors that include a means for monitoring the locations of machines 12, 14 relative to awareness zone 22 and the other mobile entities, and for responsively implementing a collision avoidance strategy. For example, worksite controller 24 may include an input module 25 configured to receive input from the user regarding a border and/or characteristics of awareness zone 22, a memory associated with input module 25, a secondary storage device, a clock, and a processor, such as a central processing unit or any other means for accomplishing a task consistent with the present disclosure. Numerous commercially available microprocessors can be configured to perform the functions of worksite controller 24. It should be appreciated that controller 24 could readily embody a computer system capable of controlling numerous other functions. Various other known circuits may be associated with worksite controller 24, including signal-conditioning circuitry, communication circuitry, and other appropriate circuitry. Worksite controller 24 may be further communicatively coupled with an external computer system, instead of or in addition to including a computer system, as desired.

Control module 32 may embody a single onboard microprocessor or multiple onboard microprocessors that include a means for controlling an operation of the associated machine 12 or 14 based on instructions from worksite controller 24. Numerous commercially available microprocessors can be configured to perform the functions of control module 32 and it should be appreciated that control module 32 could readily embody a general machine microprocessor capable of controlling numerous machine functions, if desired. Control module 32 may include a memory, a secondary storage device, a processor, and any other components for running an application. Various other circuits may be associated with control module 32 such as power supply circuitry, signal conditioning circuitry, solenoid driver circuitry, and other types of circuitry.

Display 34 may be any appropriate type of device that provides a graphics user interface (GUI) for presentation of machine, entity, and awareness zone locations and/or other information to operators of machines 12, 14. For example, display 34 may be a computer console or a cab-mounted monitor that receives instructions and/or display information from control module 32 and/or worksite controller 24. It is contemplated that display 34 may also be configured to receive input from an operator regarding desired operation of machines 12, 14 and/or worksite system 26, for example by way of a touch screen interface, if desired.

Alert device 36, when activated by control module 32 or worksite controller 24, may provide a warning and/or recommendation to an operator of machines 12, 14. The warning and recommendation may be audible, visual, or a combination of both audible and visual stimulation. In an exemplary embodiment, characteristics of alert device 36 may be customizable by the user of worksite system 26, for example by way of input module 25. The customizable characteristics of alert device 36 may include, among other things, a type of alert provided by alert device 36, a duration of the alert, a volume of the alert, etc.

As discussed above, worksite controller 24 may selectively implement a collision avoidance strategy based on the relative locations of mobile entities at worksite 10 (e.g., machines 12, 14 and/or pedestrians) and awareness zone 22. In particular, worksite controller 24 may monitor the locations of the mobile entities relative to the location of awareness zone 22, and implement the collision avoidance strategy any time one of machines 12, 14 and another mobile entity are simultaneously inside of awareness zone 22. For example, worksite controller 24 may monitor the location of first mobile machine 12 and, when worksite controller 24 determines that first mobile machine 12 has crossed or is currently crossing boundary 20 into awareness zone 22, worksite controller 24 may check to see if another mobile entity (e.g., second mobile machine 14 or a pedestrian outfitted with locating device 18) is also inside awareness zone 22. If the other mobile entity (i.e., second mobile machine 14 or the pedestrian) is not within awareness zone 22 at the time that first mobile machine 12 enters awareness zone 22, worksite controller 24 may inhibit implementation of the collision avoidance strategy. However, if the other mobile entity is nearing (i.e., traveling toward and within a threshold distance of), entering (i.e., crossing boundary 22), or completely within awareness zone 22 at the same time that first mobile machine 12 is entering awareness zone 22, worksite controller 24 may trigger implementation of the collision avoidance strategy.

In one example, the collision avoidance strategy may include activation of alert device 36. That is, in response to the determination that first mobile machine 12 is currently within or simultaneously entering awareness zone 22 together with second mobile machine 14 or another mobile entity, worksite controller 24 may generate a signal directed to control module 32 (and/or to alert device 36), thereby triggering activation of alert device 36. In the disclosed embodiment, the collision avoidance strategy includes activation of alert devices 36 located in first mobile machine 12 and the other mobile entity (e.g., within second mobile machine 14). It is contemplated, however, that activation of only a single alert device 36 may be triggered, if desired, for example the alert device 36 located within the machine/entity that enters awareness zone 22 last.

It is contemplated that the collision avoidance strategy initiated by controller 24 may include alternative or additional actions, if desired. For example, controller 24 could be configured to cause mobile machines 12, 14 within awareness zone 22 to slow down, stop, relinquish control to a remote and/or autonomous user, open communications between machines 12, 14 and/or the other mobile entities, activate exterior lights, provide warnings and/or information to a remote base station, and/or other actions known in the art. It is also contemplated that the type and severity of the action taken by controller 24 may be based on the type of machines/entities within awareness zone 22 and/or properties of those entities such as size, load, stopping distance, maneuverability, potential severity of collision, etc.

In addition to implementation of the collision avoidance strategy, worksite controller 24 may also be configured to generate an electronic representation of worksite 10 and provide the representation to each of machines 12, 14 for illustration on displays 34. For example, worksite controller 24 may be configured to generate an electronic representation of the feature at worksite 10 that is bound by awareness zone 22, the boundary 20 of awareness zone 22, and machines 12, 14 at their relative locations within awareness zone 22. The electronic representation may be communicated by worksite controller 24 to control modules 32 for subsequent illustration on displays 34 or, alternatively, directly to displays 34. It is contemplated that information, for example an alarm status and/or instructions regarding activation of the collision avoidance strategy may also be provided on displays 34, if desired.

Figure 3:
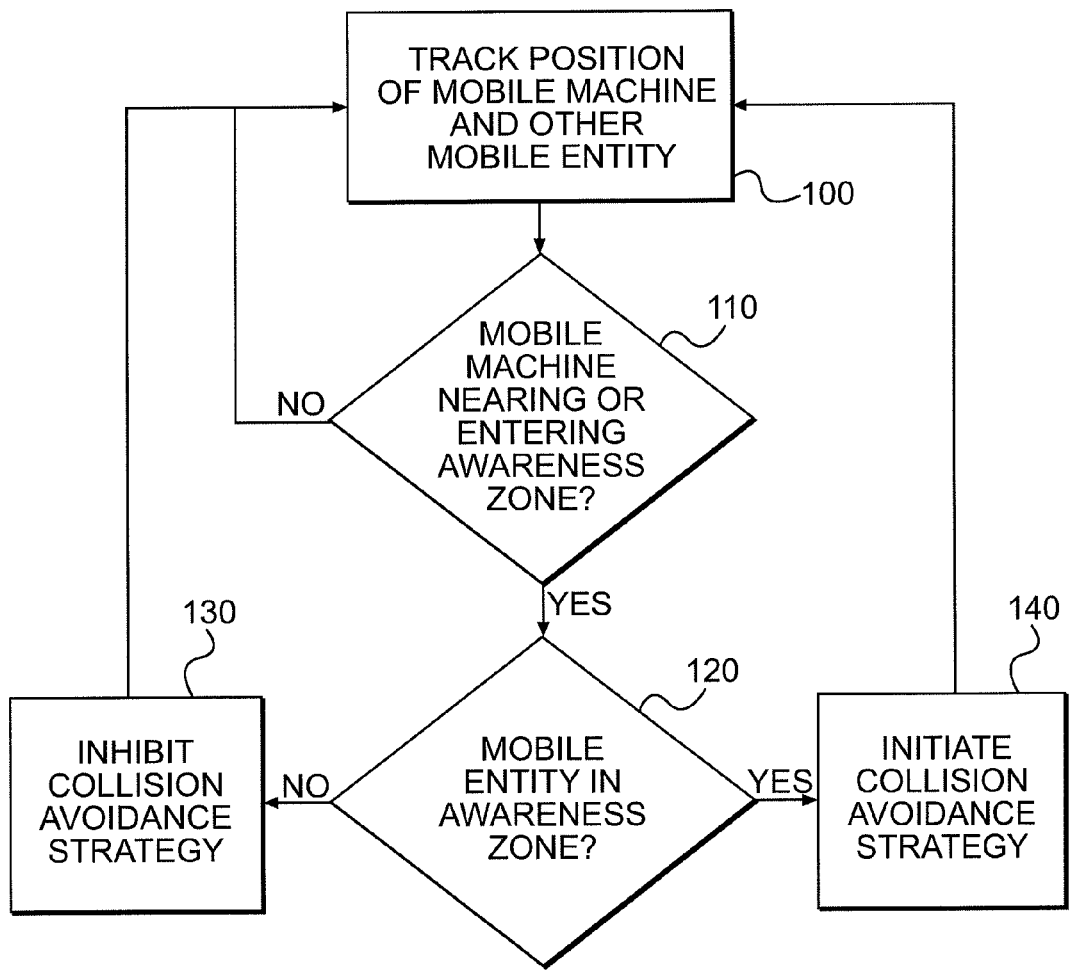
FIG. 3 is a flowchart depicting an exemplary disclosed method performed by the worksite system of FIG. 2.

FIG. 3 illustrates an exemplary operation performed by worksite system 26. FIG. 3 will be discussed in more detail in the following section to further illustrate the disclosed concepts.

INDUSTRIAL APPLICABILITY

The disclosed worksite system finds potential application at any worksite where it is desirable to avoid collisions between mobile machines and other mobile entities. The disclosed worksite system may be particularly advantageous in a worksite having a number of mobile machines/entities and features that increase the difficulty of machine control at particular locations. The disclosed worksite system may help to improve control of the machines and reduce a likelihood of collisions at the features by alerting the operators of each machine whenever a machine and another mobile entity are located within awareness zones at particular features of the worksite. Operation of worksite system 26 will now be described.

As shown in FIG. 3, controller 24 may be configured to track the positions of machines 12, 14 and other mobile entities (e.g., pedestrians equipped with locating devices 18) at worksite 10 (Step 100). Controller 24 may then determine if one of mobile machines 12, 14 is nearing or entering awareness zone 22 (Step 110). If none of mobile machines 12, 14 is nearing or entering awareness zone 22 (Step 110: No), control may return to step 100. However, when one of mobile machines 12, 14 is nearing or entering awareness zone 22 (Step 110: Yes), controller 24 may determine the presence of another mobile entity within awareness zone 22 (Step 120). For example, controller 24 may determine if mobile machine 14 or a pedestrian is within awareness zone 22 at the time that mobile machine 12 nears or enters awareness zone 22. If no other mobile entity is within awareness zone 22 at the time that mobile machine 12 nears or enters awareness zone 22 (Step 120: No), controller 24 may inhibit implementation of the collision avoidance strategy (Step 130), and control may return to step 100. However, in the situation where another mobile entity is within awareness zone 22 at the time that mobile machine 12 nears or enters awareness zone 22 (Step 120: Yes), controller 24 may initiate the collision avoidance strategy (Step 140). For example, controller 24 may alert the operator of mobile machine 12 and the operator of the other mobile entity (or the pedestrian) of the situation.

It will be apparent to those skilled in the art that various modifications and variations can be made to the worksite system of the present disclosure. Other embodiments will be apparent to those skilled in the art from consideration of the specification and practice of the worksite system disclosed herein. It is intended that the specification and examples be considered as exemplary only, with a true scope being indicated by the following claims and their equivalents.

What is claimed is:

1. A worksite system, comprising:
    an input module configured to receive at least one of a boundary and a characteristic of an awareness zone at a worksite;
    at least one locating device configured to determine a position of a mobile machine and another mobile entity at the worksite, wherein the awareness zone is independent of the positions of the mobile machine and the mobile entity; and
    a controller in communication with the input module and the at least one locating device, the controller being configured to:
        track movement of the mobile machine;
        make a determination of a presence of the other mobile entity; and
        initiate a collision avoidance strategy in response to at least one of the mobile machine nearing or entering the awareness zone only when the mobile entity is in the awareness zone.

2. The worksite system of claim 1, wherein initiation of the collision avoidance strategy includes generation of an alert directed to at least one of the mobile machine and the other mobile entity.

3. The worksite system of claim 2, wherein the controller is configured to direct the alert to both the mobile machine and the other mobile entity.

4. The worksite system of claim 2, wherein the alert generated by the controller is customizable by a user of the worksite system.

5. The worksite system of claim 1, wherein the at least one of the boundary and the characteristic of the awareness zone is received from a user of the worksite system.

6. The worksite system of claim 1, wherein the controller is further configured to:
generate an electronic map of the worksite;
generate electronic representations of the mobile machine and the other mobile entity on the electronic map based on information from the at least one locating device; and
generate at least one electronic boundary on the electronic map based on the at least one of the boundary and the characteristic of the awareness zone.

7. The worksite system of claim 6, wherein the controller is configured to communicate the electronic map having the electronic representations of the mobile machine and the other mobile entity and the at least one electronic boundary to the mobile machine and the other mobile entity for display therein.

8. The worksite system of claim 1, wherein the awareness zone is stationary and associated with a feature of the worksite.

9. The worksite system of claim 8, wherein the feature includes at least one of an intersection, an excavation area, a dump area, and a service area.

10. The worksite system of claim 1, wherein the awareness zone has at least one of a shape and a size based on a type of the mobile machine and the other mobile entity.

11. The worksite system of claim 1, wherein the controller is configured to inhibit initiation of the collision avoidance strategy when only the mobile machine is in the awareness zone.

12. A worksite system, comprising:
an input module configured to receive at least one of a position and a characteristic of a stationary awareness zone associated with a feature at a worksite;
at least one locating device configured to determine a position of a first mobile machine and a second mobile machine at the worksite, wherein the awareness zone is independent of the positions of the first mobile machine and the second mobile machine; and
a controller in communication with the input module and the at least one locating device, the controller being configured to:
track movement of the first mobile machine toward the awareness zone;
make a determination of a presence of the second mobile machine in the awareness zone;
generate an alert directed to both the first and second machines in response to at least one of the first mobile machine nearing or entering the awareness zone only when the second mobile machine is in the awareness zone;
generate an electronic map of the worksite having electronic representation of the first and second mobile machines and at least one electronic boundary on the electronic map associated with the awareness zone; and
communicate the electronic map to the first and second mobile machines for display therein.

13. A method of avoiding collisions at a common worksite, the method comprising:
receiving at least one of a boundary and a characteristic of an awareness zone at the common worksite;
remotely tracking movement of a mobile machine into the awareness zone;
determining a presence of another mobile entity in the awareness zone, wherein the awareness zone is independent of the positions of the mobile machine and the mobile entity; and
initiating a collision avoidance strategy in response to at least one of the mobile machine nearing or entering the awareness zone only when the other mobile entity is in the awareness zone.

14. The method of claim 13, wherein initiating the collision avoidance strategy includes directing an alert to at least one of the mobile machine and the other mobile entity.

15. The method of claim 14, wherein the directing the alert includes directing the alert to both the mobile machine and the other mobile entity.

16. The method of claim 14, wherein the alert is customizable by a user.

17. The method of claim 13, wherein receiving the at least one of the boundary and the characteristic of an awareness zone includes receiving the at least one of the boundary and the characteristic of an awareness zone from a user.

18. The method of claim 13, further including:
generating an electronic map of the worksite;
generating electronic representations of the mobile machine and the other mobile entity on the electronic map;
generating at least one electronic boundary on the map based on the at least one of the position and the characteristic of the awareness zone; and
communicating the electronic map having the electronic representations of the mobile machine, the other mobile entity, and the at least one electronic boundary to the mobile machine and the other mobile entity for display therein.

19. The method of claim 13, wherein the awareness zone is substantially stationary and associated with at least one of an intersection, an excavation area, a dump area, and a service area.

20. The method of claim 13, further including inhibiting initiation of the collision avoidance strategy when only the mobile machine is in the awareness zone.

* * * * *